United States Patent [19]

Tamai et al.

[11] Patent Number: 5,514,463
[45] Date of Patent: May 7, 1996

[54] MAGNETIC RECORDING MEDIUM

[75] Inventors: Kiminori Tamai, Saku; Kiyotaka Okuyama, Usudamachi; Shigeo Kurose, Saku, all of Japan

[73] Assignee: TDK Corporation, Tokyo, Japan

[21] Appl. No.: 55,404

[22] Filed: Apr. 30, 1993

Related U.S. Application Data

[63] Continuation of Ser. No. 816,998, Jan. 3, 1992, abandoned.

[30] Foreign Application Priority Data

Jan. 8, 1991 [JP] Japan ................................. 3-011534

[51] Int. Cl.$^6$ ................ B32B 5/16; G11B 5/66; B05D 5/12; C04B 35/04
[52] U.S. Cl. .............. 428/323; 428/329; 428/330; 428/694 B; 428/694 BA; 427/128; 427/129; 427/130; 427/131; 252/62.54; 252/62.58; 252/62.61; 252/62.62; 252/62.63
[58] Field of Search .................. 428/329, 330, 428/900, 694 B, 694 BA, 323; 427/128–131; 252/62.54, 62.58, 62.61, 62.62, 62.63

[56] References Cited

U.S. PATENT DOCUMENTS

| | | | |
|---|---|---|---|
| 4,323,621 | 4/1982 | Kober | 428/216 |
| 4,748,080 | 5/1988 | Itozawa | 428/328 |
| 4,803,132 | 2/1989 | Kishimoto | 428/141 |
| 4,857,417 | 8/1989 | Kitaoka et al. | 428/694 |
| 4,980,230 | 12/1990 | Saito et al. | 428/329 |

FOREIGN PATENT DOCUMENTS

| | | |
|---|---|---|
| 55-69839 | 6/1980 | Japan. |
| 57-198606 | 12/1982 | Japan. |
| 62-89226 | 4/1987 | Japan. |

*Primary Examiner*—Leszek Kiliman
*Attorney, Agent, or Firm*—Sprung Horn Kramer & Woods

[57] ABSTRACT

A magnetic recording medium includes a non-magnetic support and a magnetic layer, The magnetic layer comprises a binder and a Co-containing iron-based metal powder dispersed in the binder, characterized in that particles of the metal powder have a greater Co concentration in their surface layer than their inside of the particles, The Co-containing metal powder is easily dispersed in a binder and provides high Br/Bm and orientation. If Ba is contained in the starting powder the localization of Co in the surface area is realized.

2 Claims, 1 Drawing Sheet

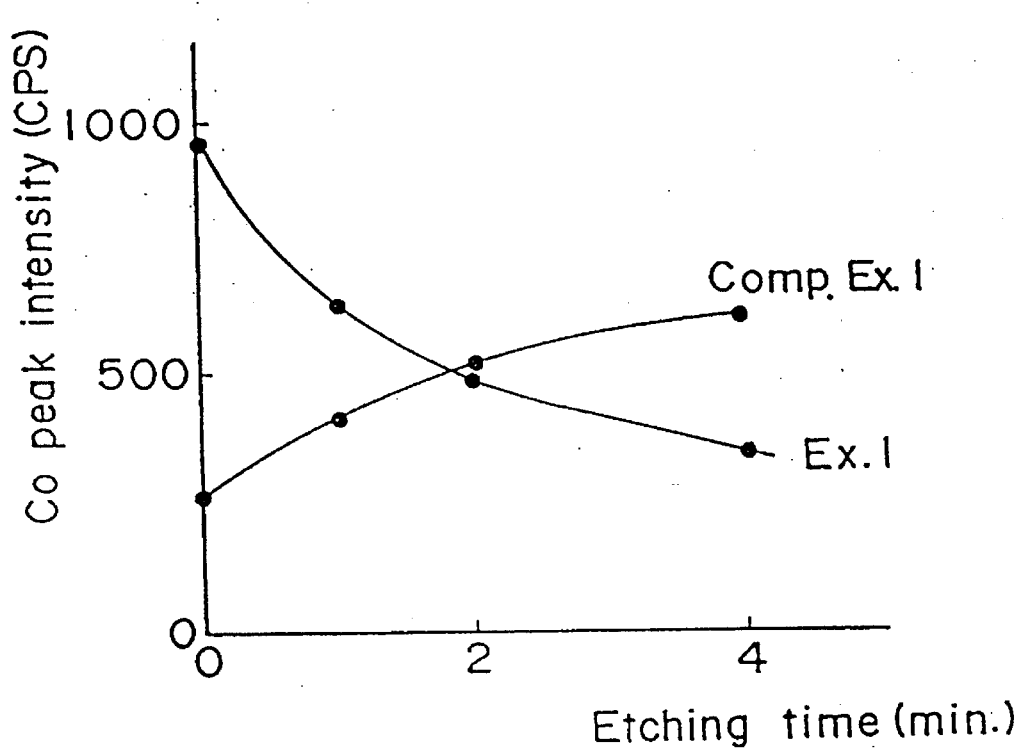
F I G. 1

MAGNETIC RECORDING MEDIUM

This application is a continuation of application Ser. No. 07/816,998, filed Jan. 3, 1992, now abandoned.

THE TECHNICAL FIELD OF THE INVENTION

The present invention relates to a magnetic recording medium and more particularly an improvement in an iron-based metal magnetic powder(hereinafter called "metal powder" unless otherwise stated) used for a magnetic recording medium. The term "iron-based" used here means that iron is contained in a major component.

PRIOR ART

Magnetic recording is in the direction of more and more higher density recording which requires a higher Hc, a greater saturated magnetic flux density $Bm(or\sigma_g)$ and a greater remnant magnetic flux density. Iron-based metal powders have been used in the art as the magnetic powders adequate for this purpose.

In compact devices such as 8 mm video tapes, to realize a low running speed and a long running period of time, it is necessary to improve the conventional magnetic recording medium to obtain a magnetic recording medium capable of obtaining a higher output, a higher S/N and a higher C/N.

In order to improve the output, S/N and C/N it is considered that the dispersibility or dispersing power of metal powders must be enhanced so as to attain a greater Br or a better surface smoothness to reduce the spacing loss when formed into a tape. The conventional magnetic recording media were not sufficient in this respect.

In the conventional magnetic recording media, each comprised of a non-magnetic support and a magnetic layer containing an iron-based metal powder, there has been a practice to incorporate Co into, or deposit it on, the metal powders(Japanese Patent Application Kokai No. 54-122664 and others).

PROBLEM TO BE SOLVED

However, these prior art metal powders do not have a sufficient dispersibility. The study by the present inventors revealed that the cause is attributed to the processes of manufacturing the metal powders. More specifically, the conventional metal powders were produced by first impregnating iron oxide powders with a cobalt compound and then reducing the impregnated iron oxides in a reducing atmosphere. Accordingly, the cobalt was migrated uniformly into the inside of the particles of the metal powders and thus the affinity of the metal powder to the binder was impaired.

Accordingly, a principal object of the present invention is to provide a magnetic recording medium using a metal powder having an excellent dispersibility and, when used in tapes, having a high Br/Bm ratio and a good orientation.

SUMMARY OF THE INVENTION

Accordingly, the present invention provides a magnetic recording medium including a non-magnetic support and a magnetic layer, said magnetic layer comprising a binder and a Co-containing iron-based metal powder dispersed in the binder, characterized in that particles of the metal powder have a greater Co concentration in their surface layer than their inside of the particles.

According to the present invention the metal powder further contains Ba as a sub-component.

The present invention further provide a process for producing a magnetic recording medium, which comprises preparing a powder of hydrated iron oxide, preferably containing Ba as a sub-component, reducing the Co-deposited powder in a reducing atmosphere to produce a magnetic powder, dispersing the powder in a binder to form a magnetic coating composition, and applying the composition onto a non-magnetic support.

According to the present invention, desired localization of cobalt in the surface layer is realized and a superior dispersibility of the metal powder in a binder is achieved.

DETAILED EXPLANATION OF THE INVENTION

It has been found that a superior magnetic recording medium according to the present invention is attained by having Ba contained in the magnetic powder prior to the reducing treatment. More particularly, an iron-based metal powder is produced by using as a starting material a hydrated iron oxide powder containing Ba as a sub-component, depositing on the surface of the hydrated iron oxide and thereafter reducing it in a reducing atmosphere to produce a magnetic powder, dispersing the metal powder in a binder to form a coating composition, and applying it onto a non-magnetic support. This process provides a magnetic recording medium of a high dispersibility which was not realized in the conventional processes.

As the starting materials for the metal powders, known acicular goethite(hydrated iron oxide), acicular $\alpha$-iron oxide, acicular $\gamma$-iron oxide or acicular magnetite may be used.

The Ba source is added to the starting material, for example, in the form of a Ba compound during the step of producing the hydrated iron oxide.

As the reducing atmosphere, known gases such as hydrogen may be used.

As the reducing temperature, known temperatures between 400° C.–600° C. may be used.

The Co compound which is used in the present invention may include cobalt chloride, cobalt sulfate and the like.

DESCRIPTION OF PREFERRED EXAMPLES

EXAMPLE 1

1000 grs. of $FeCl_2 \cdot 4H_2O$ was dissolved in 20 litters of $H_2O$ kept at 45° C. and to this solution was added a solution of 4 grs. of $BaCl_2 \cdot 2H_2O$ in 100 mliter. of water which was stirred for 30 minutes. Next, to this solution was slowly added an aqueous solution of 300 grs. of NaOH in 1000 mliters of water at 45° C., and after completion of the addition the solution was kept stirred for 60 minutes. Then, the temperature was raised up to 70° C. and the stirring was maintained while blowing in the air at a rate of 100 liters/min. for 6 hrs. Thereafter, the solution was left to stand to cool and, after washing with water, filtered and dried at 60° C. for 24 hrs. to obtain a hydrated iron oxide. 100 grs. of the resulting hydrated iron oxide was charged in 6 liters of $H_2O$ and mixed and stirred. To this mixture were added 11 liters of a solution of $Na_2SiO_3$ in water at an amount of Si being 3.0 wt % based on the iron and 85 mliters of a 1 mole solution of $CoCl_2$ and after a sufficient stirring the resulting liquid was filtered, washed and dried.

50 grs. of the resulting acicular a α-FeOOH was sampled and was reduced at 450° C. for 6 hrs. while flowing hydrogen stream at 11 liters/min. Thereafter, it was cooled to the room temperature and then soaked in toluene for ten minutes while blowing the air and air dried.

Thusly obtained acicular metal powder was used to prepare a magnetic coating composition using the following formulation.

|  | parts by weight |
| --- | --- |
| Metal powder | 100 |
| Vinyl chloride-vinyl acetate-vinyl alcohol copolymer (VAGH, tradename of UCC Corp.) | 10 |
| Polyurethane resin (N-2306, tradename of Nippon Polyurethane K.K. of Japan) | 10 |
| Low molecular weight polyisocyanate compound (Colonate L, tradename of Nippon Polyurethane K.K. of Japan) | 5 |
| Stearic acid | 2 |
| Lecitin | 2 |
| $Al_2O_3$ | 5 |
| Toluene | 50 |
| Methylethylketone | 50 |
| Methylisobutylketone | 50 |

This magnetic coating was applied on the surface of a polyester film with a thickness of 10 μm and subjected to magnetic orientation, calendering and thereafter heat curing. The final thickness of the magnetic coating was 4.0 μm.

This was slit into a strip of 8 mm wide to produce sample No. 1.

Further, the compounds to be added and the weight ratios were changed to prepare metal powders according to a process similar to Example 1. Using these metal powders tape samples Nos. 2–6 and comparative samples Nos. 1–3 were produced.

EXAMPLE 2

Example 1 was repeated except that 4 grs. of $BaCl_2 \cdot 2H_2O$ was reduced to 1 gr. to produce sample No. 2 (present invention).

EXAMPLE 3

Example 1 was repeated except that 4 grs. of $BaCl_2 \cdot 2H_2O$ was increased to 8 grs. to produce sample No. 3 (present invention). Example 4

Example 1 was repeated except that 4 grs. of $BaCl_2 \cdot 2H_2O$ was reduced to 0.4 gr. to produce sample No. 4 (present invention).

EXAMPLE 5

Example 1 was repeated except that 85 mliters of $CoCl_2$ was reduced to 64 mliters to produce sample No. 5 (present invention).

EXAMPLE 6

Example 1 was repeated except that 85 mliters of $CoCl_2$ was increased to 128 mliters to produce sample No. 6 (present invention).

Comparative Example 1

Example 1 was repeated except that 4 grs. of $BaCl_2 \cdot 2H_2O$ was replaced by 46 grs. of $ZnCl_2$ to produce comparative sample No. 1 (comparative).

Comparative Example 2

Example 1 was repeated except that 4 grs. of $BaCl_2 \cdot 2H_2O$ was replaced by 1.65 gr. of $CrCl_2$ to produce comparative sample No. 2 (comparative).

Comparative Example 3

Example 1 was repeated except that 4 grs. of $BaCl_2 \cdot 2H_2O$ was replaced by 1.61 gr. of $MnCl_2$ to produce comparative sample No. 3 (comparative).

The magnetic powders prepared in the Examples and the Comparative Examples were subjected to etching by means of ESCA and the relationship between the Co quantity and the etching period of time is plotted in FIG. 1.

According to this figure, it is seen that the quantity of the Co elution is strongly dependent on the Ba content. The metal powders according to the present invention exhibit a greater Co elution during the initial stage, while the elution of the metal powders in the Comparative Examples increase with the lapse of the time. This shows that Co is localized in the surface layer of the particles of the metal powders in the present invention while in the Comparative Examples Co is distributed throughout the particles of the powders.

From the foregoing, it has been made clear that when the hydrated iron-based oxide containing Ba is used as a starting material, more Co is retained in the surface layer of the particles of the powder, while that containing no Ba permits Co to migrate into the inside of the particles.

The glossiness of the surface, the magnetic and electric properties (Y-out and C-out) are listed in Table 1.

From Table 1, it is understood that the more is the Co content in the surface layer the greater are the glossiness after calendering and the magnetic and electric properties.

According to the present invention, by increasing the secondary Ba content in the starting hydrated iron oxide, an outstanding advantage is attained that Co is localized in the surface layer of the particles of the magnetic metal powders, whereby the dispersibility of the metal powders in binders is remarkably enhanced as proved by the increased glossiness, resulting in the high glossiness of the tapes produced form this metal powder as well as the high magnetic and electric properties.

TABLE 1

| Sample No. | Metal added based on Fe (wt %) | | | | | | Glossiness (%) | | Tape properties | | | Orie ntn. | Output | |
| | Ba | Zn | Cr | Mn | Co | Si | As coated | After calen. | Hc (Oe) | Br (G) | Br/Bm | | Y-out (dB) | C-out (dB) |
| --- | --- | --- | --- | --- | --- | --- | --- | --- | --- | --- | --- | --- | --- | --- |
| Examples | | | | | | | | | | | | | | |
| 1 | 0.80 | — | — | — | 8.0 | 3.0 | 125 | 198 | 1520 | 2520 | 0.835 | 1.95 | +0.5 | +1.2 |
| 2 | 0.20 | — | — | — | 8.0 | 3.0 | 124 | 195 | 1525 | 2550 | 0.834 | 1.92 | +0.4 | +1.0 |
| 3 | 1.60 | — | — | — | 8.0 | 3.0 | 123 | 190 | 1520 | 2450 | 0.826 | 1.84 | +0.3 | +1.1 |
| 4 | 0.08 | — | — | — | 8.0 | 3.0 | 126 | 199 | 1510 | 2500 | 0.830 | 1.90 | +0.5 | +0.5 |
| 5 | 0.80 | — | — | — | 6.0 | 3.0 | 124 | 196 | 1515 | 2490 | 0.833 | 1.94 | +0.5 | +1.0 |
| 6 | 0.80 | — | — | — | 12.0 | 3.0 | 123 | 200 | 1540 | 2560 | 0.830 | 1.91 | +0.4 | +0.9 |
| Comp. 1 | — | 0.25 | — | — | 8.0 | 3.0 | 118 | 190 | 1530 | 2360 | 0.795 | 1.65 | −0.3 | −0.1 |
| Comp. 2 | — | — | 0.25 | — | 8.0 | 3.0 | 115 | 187 | 1520 | 2340 | 0.790 | 1.63 | −0.5 | −0.2 |
| Comp. 3 | — | — | — | 0.25 | 8.0 | 3.0 | 120 | 192 | 1510 | 2280 | 0.780 | 1.57 | −0.7 | −0.5 |

We claim:

1. A magnetic recording medium including a non-magnetic support and a magnetic layer, said magnetic layer comprising a binder and a barium (dash) containing iron-based metal powder dispersed in the binder, wherein particles of the metal powder are formed by reduction of barium-containing iron oxide at about 400° to 600° C. and contain cobalt with a greater concentration in their surface layer than inside of the particles.

2. A process for producing a magnetic recording medium according to claim 1, which comprises preparing a powder of hydrated iron oxide containing Ba as a sub-component, depositing Co on the surface of the powder of the hydrated iron oxide, reducing the Co-deposited powder in a reducing atmosphere at about 400° to 600° C. to produce a magnetic powder, dispersing the powder in a binder to form a magnetic coating composition, and applying the composition onto a non-magnetic support.

* * * * *

UNITED STATES PATENT AND TRADEMARK OFFICE
CERTIFICATE OF CORRECTION

PATENT NO. : 5,514,463
DATED : May 7, 1996
INVENTOR(S) : Tamai, et al.

It is certified that error appears in the above-indentified patent and that said Letters Patent is hereby corrected as shown below:

Col. 5, line 22  Delete " (dash) " and substitute
-- - --

Signed and Sealed this

Thirtieth Day of July, 1996

Attest:

BRUCE LEHMAN

Attesting Officer    Commissioner of Patents and Trademarks